US010618592B2

(12) United States Patent
Tsuda (10) Patent No.: US 10,618,592 B2
(45) Date of Patent: Apr. 14, 2020

(54) SUPPORT STRUCTURE OF DRIVE SHAFT (71) Applicant: HONDA MOTOR CO., LTD., Tokyo (JP)

(72) Inventor: Tsuyoshi Tsuda, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 156 days.

(21) Appl. No.: 15/899,926

(22) Filed: Feb. 20, 2018

(65) Prior Publication Data

US 2018/0251186 A1    Sep. 6, 2018

(30) Foreign Application Priority Data

Mar. 1, 2017  (JP) ................................ 2017-038754

(51) Int. Cl.
    *B62K 25/02*     (2006.01)
    *B62K 25/28*     (2006.01)
    *B62K 25/00*     (2006.01)
    *B62K 11/04*     (2006.01)

(52) U.S. Cl.
    CPC .............. *B62K 25/02* (2013.01); *B62K 11/04* (2013.01); *B62K 25/005* (2013.01); *B62K 25/283* (2013.01)

(58) Field of Classification Search
    CPC .... B62K 25/02; B62K 25/005; B62K 25/283; B62K 11/04
    See application file for complete search history.

(56) References Cited

U.S. PATENT DOCUMENTS

| 4,742,884 A * | 5/1988 | Ishikawa ................. B60T 1/065 180/219 |
| 6,450,282 B1 | 9/2002 | Gogo et al. |
| 8,246,064 B2 * | 8/2012 | Kuroiwa ................. B62M 3/003 280/261 |
| 10,112,677 B2 * | 10/2018 | Ishii .......................... B62J 99/00 |

(Continued)

FOREIGN PATENT DOCUMENTS

| EP | 1780110 A1 | 5/2007 |
| JP | 2000-272571 A | 10/2000 |

(Continued)

OTHER PUBLICATIONS

Extended European Search Report, dated Aug. 7, 2018, for European Application No. 18159440.9.

(Continued)

*Primary Examiner* — Drew J Brown
(74) *Attorney, Agent, or Firm* — Birch, Stewart, Kolasch & Birch, LLP (57) ABSTRACT

In a support structure of a drive shaft in which a power transmission mechanism transmitting the power of a power source and a driving wheel are fixed to a drive shaft rotatably supported by a support portion provided in a vehicle, a female screw portion is formed in the inner peripheral surface of a hollow portion formed at an end portion of the drive shaft. The power transmission mechanism is fixed to the drive shaft by fastening a bolt screwed with the female screw portion. A step portion is provided between a small-diameter portion and a large-diameter portion formed on the outer peripheral surface of the drive shaft. The position in the axial direction of the power transmission mechanism fixed to the small-diameter portion side is regulated by the step portion.

10 Claims, 6 Drawing Sheets

(56) References Cited

U.S. PATENT DOCUMENTS

| | | |
|---|---|---|
| 2006/0108858 A1 | 5/2006 | Mercat et al. |
| 2006/0108859 A1 | 5/2006 | Mercat et al. |
| 2007/0095164 A1* | 5/2007 | Yamanaka ............ B62M 3/003 74/594.1 |
| 2007/0241530 A1* | 10/2007 | Nonoshita ................ B62M 3/00 280/259 |
| 2010/0081512 A1* | 4/2010 | Nimura ................ B62K 25/283 464/140 |
| 2011/0084544 A1* | 4/2011 | Thorpe .................... B60B 3/14 301/110.5 |
| 2014/0274519 A1 | 9/2014 | Bettin |
| 2014/0284897 A1* | 9/2014 | Bettin .................. B62K 25/005 280/260 |
| 2016/0318573 A1 | 11/2016 | Ishii et al. |
| 2019/0092423 A1* | 3/2019 | Kogirima ............... B62K 25/20 |

FOREIGN PATENT DOCUMENTS

| | | |
|---|---|---|
| JP | 2007-302222 A | 11/2007 |
| WO | WO 2011/117966 A1 | 9/2011 |
| WO | WO 2015/092834 A1 | 6/2015 |

OTHER PUBLICATIONS

Japanese Office Action, dated Jan. 9, 2019, for Japanese Application No. 2017-038754, along with an English translation.

\* cited by examiner

SUPPORT STRUCTURE OF DRIVE SHAFT

CROSS-REFERENCE TO RELATED APPLICATIONS

The present application claims priority under 35 USC 119 to Japanese Patent Application No. 2017-038754 filed Mar. 1, 2017 the entire contents of which are hereby expressly incorporated by reference.

The present invention relates to a support structure of a drive shaft and, in particular, to a support structure of a drive shaft for fastening and fixing a sprocket, a wheel hub, etc. to a drive shaft of a rear wheel.

BACKGROUND ART

In the past, there has been known, in connection with a saddle type vehicle such as a motorcycle, a construction in which a rear wheel as a driving wheel is rotatably supported at the rear end of a swing arm supported so as to be vertically swingable with respect to a vehicle body frame.

Patent Document 1 discloses a so-called cantilever-like swing arm in which only one arm portion supports the axle of the rear wheel, in which a driven sprocket, a rear wheel hub, etc. are fastened and fixed to a predetermined position by using a large-diameter nut screwed with a female screw provided on the outer periphery of both end portions of the axle.

CITATION LIST

Patent Literature

Patent Document 1: WO 2015/092834A

SUMMARY OF INVENTION

Technical Problem

In the support structure of a drive shaft using a nut as disclosed in Patent Document 1, in order to prevent the nut from becoming loose as a result of the repeated input of a drive force transmitted from the driven sprocket and the rear wheel, countermeasures to prevent nut loosening are taken. For example, the screw portion is elongated to enhance the fastening force, or a swaging nut or a split pin is employed. These methods, however, have a problem in that the drive shaft is rather elongated and that the number of assembly processes and the number of components increase.

It is an object of the present invention to provide a support structure of a drive shaft helping to solve the above problem in the related art and making it possible to enhance the loosening prevention effect while preventing an increase in weight and in the number of assembly processes.

Solution to Problems

To achieve the afore-mentioned object, the present invention has a first feature in that a support structure of a drive shaft in which a power transmission mechanism (A) transmitting a power of a power source and a driving wheel (WR) are fixed to a drive shaft (70) rotatably supported by a support portion (53) provided in a vehicle (1), wherein a female screw portion (78) is formed in an inner peripheral surface of a hollow portion formed at an end portion of the drive shaft (70), and the power transmission mechanism (A) is fixed to the drive shaft (70) by fastening a bolt (60) screwed with the female screw portion (78).

The present invention has a second feature in that a step portion (76) is provided between a small-diameter portion (71) and a large-diameter portion (72) formed on an outer peripheral surface of the drive shaft (70), and a position in an axial direction of the power transmission mechanism (A) fixed to the small-diameter portion (71) side is regulated by the step portion (76).

The present invention has a third feature in that the vehicle (1) is a motorcycle, a swing arm (20) of the motorcycle (1) is of a cantilever-type structure in which a single arm supports the drive shaft (70), the support portion (53) is formed at a rear end portion of the swing arm (20), and the bolt (60) is screwed with one side end portion of the drive shaft (70) extending through the support portion (53), and the driving wheel (WR) is fixed to the other side end portion of the drive shaft (70).

The present invention has a fourth feature in that when the power transmission mechanism (A) is fixed to the drive shaft (70) by fastening the bolt (60), a gap (90) is formed between an end portion (70a) of the drive shaft (70) and a head portion (63) of the bolt (60).

The present invention has a fifth feature in that the power transmission mechanism (A) includes a hub damper case (24) arranged at an end portion of the drive shaft (70), the hub damper case (24) is rotatably supported by the drive shaft (70) via a bearing (50), and when the bolt (60) is screwed with the drive shaft (70), a male screw portion (62) of the bolt (60) extends to a position where it overlaps the bearing (50) in the axial direction.

The present invention has a sixth feature in that an axial through-hole (61) is formed in the bolt (60).

Advantageous Effects of Invention

According to the first feature of the present invention, a support structure of a drive shaft in which a power transmission mechanism (A) transmitting a power of a power source and a driving wheel (WR) are fixed to a drive shaft (70) rotatably supported by a support portion (53) provided in a vehicle (1), wherein a female screw portion (78) is formed in an inner peripheral surface of a hollow portion formed at an end portion of the drive shaft (70), and the power transmission mechanism (A) is fixed to the drive shaft (70) by fastening a bolt (60) screwed with the female screw portion (78). Therefore, unlike the construction in which the nut is screwed with the female screw portion formed in the outer periphery of the drive shaft, the female screw portion is formed in the inner peripheral surface of the drive shaft, so that it is possible to elongate the female screw portion and to enhance the fastening force of the power transmission mechanism without having to increase the protrusion amount of the end portion of the drive shaft. Further, it is the bolt head portion that is exposed to the exterior, so that it is possible to achieve an improvement in terms of outward appearance by providing the bolt head portion with a predetermined design.

According to the second feature of the present invention, a step portion (76) is provided between a small-diameter portion (71) and a large-diameter portion (72) formed on an outer peripheral surface of the drive shaft (70), and a position in an axial direction of the power transmission mechanism (A) fixed to the small-diameter portion (71) side is regulated by the step portion (76). Therefore, solely by fastening the bolt to the end portion of the drive shaft, the positioning and fixation of the power transmission mechanism are completed, thereby providing a satisfactory assembly workability.

According to the third feature of the present invention, the vehicle (1) is a motorcycle, a swing arm (20) of the motorcycle (1) is of a cantilever-type structure in which a single arm supports the drive shaft (70), the support portion (53) is formed at a rear end portion of the swing arm (20), and the bolt (60) is screwed with one side end portion of the drive shaft (70) extending through the support portion (53), and the driving wheel (WR) is fixed to the other side end portion of the drive shaft (70). Therefore, in a vehicle to which a cantilever-like swing arm is applied, it is possible to reduce the protrusion amount of the drive shaft on the side to which the power transmission mechanism is fixed.

According to the fourth feature of the present invention, when the power transmission mechanism (A) is fixed to the drive shaft (70) by fastening the bolt (60), a gap (90) is formed between an end portion (70a) of the drive shaft (70) and a head portion (63) of the bolt (60). Therefore, when the end portion of the drive shaft and the head portion of the bolt are in contact with each other, there is the possibility of an external force repeatedly input to the drive shaft from the driving wheel and the power transmission mechanism acting as a force loosening the bolt. Due to the provision of the predetermined gap between them, however, it is possible to prevent the external force from being transmitted to the end surface of the drive shaft. As a result, there is no need to provide a bolt loosening prevention mechanism, and it is possible to reduce the number of components and the number of assembly man-hours.

According to the fifth feature of the present invention, the power transmission mechanism (A) includes a hub damper case (24) arranged at an end portion of the drive shaft (70), the hub damper case (24) is rotatably supported by the drive shaft (70) via a bearing (50), and when the bolt (60) is screwed with the drive shaft (70), a male screw portion (62) of the bolt (60) extends to a position where it overlaps the bearing (50) in the axial direction. Therefore, the bearing is arranged on the outer peripheral side of the portion where the female screw portion of the drive shaft and the male screw portion of the bolt are screwed with each other, whereby the rigidity of the screwed portion is enhanced, making it possible to increase the fastening strength.

According to the sixth feature of the present invention, an axial through-hole (61) is formed in the bolt (60). Therefore, the bolt is formed in a hollow structure to achieve a reduction in weight. Further, by making the sectional configuration of the through-hole a predetermined configuration with which a fastening tool such as a hexagonal wrench is fit-engaged, there is no need to form the outer peripheral portion of the bolt head portion in a hexagonal nut configuration, and it is possible to achieve an improvement in terms of design freedom for the bolt head portion.

DESCRIPTION OF EMBODIMENTS

Figure 1:
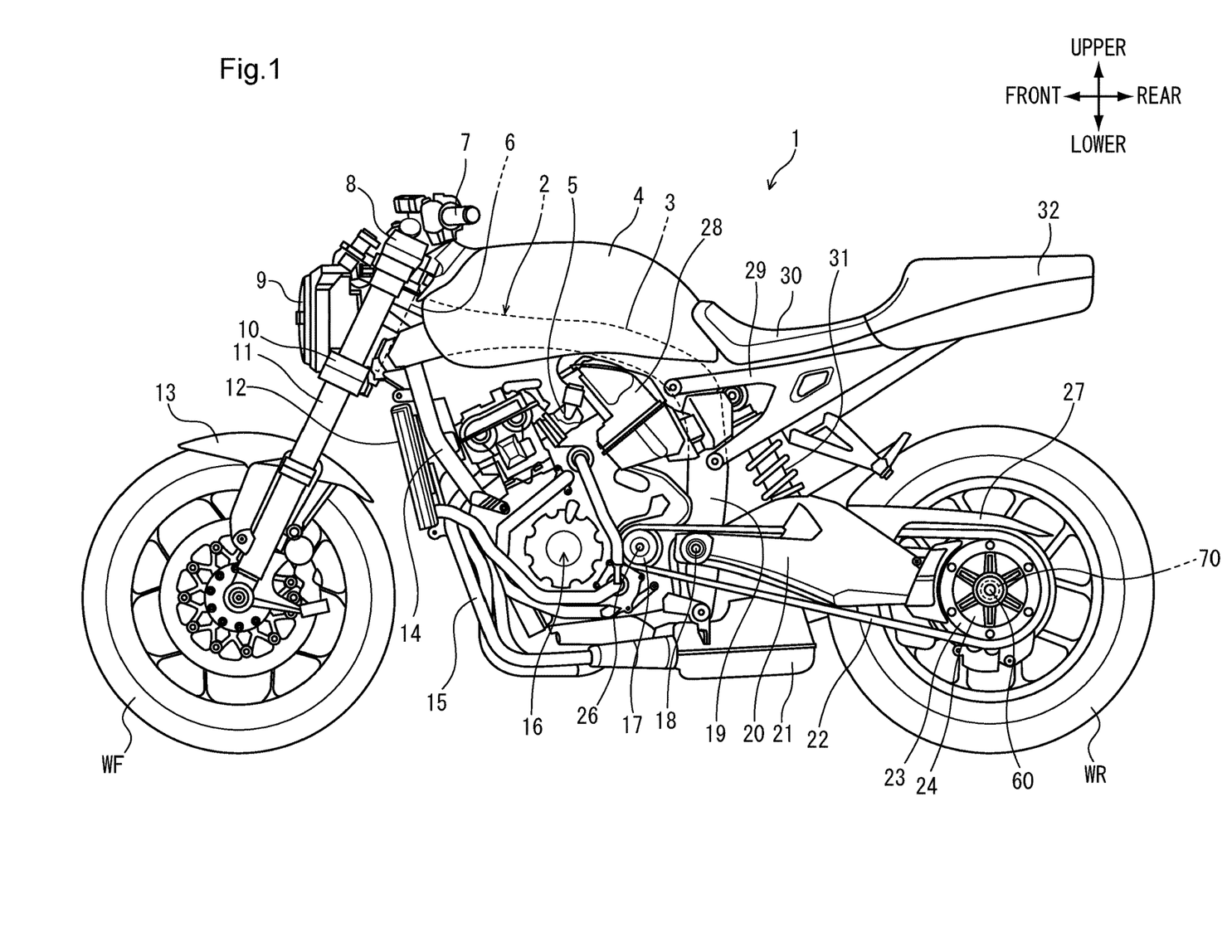
FIG. 1 shows a left-hand side view of a motorcycle to which a support structure of a drive shaft according to an embodiment of the present invention is applied.

In the following, a preferred embodiment of the present invention will be described in detail with reference to the drawings. FIG. 1 is a left-hand side view of a motorcycle 1 to which a support structure of a drive shaft according to an embodiment of the present invention is applied. To the front end of a main frame 3 constituting a vehicle body frame 2, there is fixed a head pipe 6 rotatably supporting a steering stem (not depicted). A pair of right and left front forks 11 rotatably supporting a front wheel WF are supported by a top bridge 8 and a bottom bridge 10 fixed to the steering stem at the positions above and below the head pipe 6. A steering handle 7 is mounted on top of the top bridge 8.

Connected to the rear lower portion of the main frame 3 is a pivot plate 19 having a pivot 18. The pivot 18 swingably supports the front end portion of a swing arm 20 rotatably supporting a rear wheel WR as a driving wheel. The swing arm 20 is suspended from the vehicle body frame 2 via a rear cushion 31 at a position on the rear side of the pivot 18.

An engine 16 as the power source is supported on the vehicle body frame 2 by a plurality of engine hangers provided on the pivot plate 19 and a hanger pipe 14 extending downwards from the rear side of the head pipe 6. Arranged in front of the hanger pipe 14 is a radiator 12 for engine cooling water. On the back surface of the engine 16, there are arranged a throttle body 5 equipped with a fuel injection device and an air cleaner box 28. An exhaust pipe 15 connected to an exhaust port on the front side of the engine 16 is connected to an expansion chamber 21 arranged below the pivot plate 19. The power of the engine 16 is transmitted to a driven sprocket 23 rotating integrally with the rear wheel WR via a drive chain 22 wound around a drive sprocket 17 fixed to an output shaft 26. The driven sprocket 23 is fixed to the outer peripheral portion of a hub damper case 24, and the hub damper case 24 is fixed to a drive shaft 70 by a bolt 60. Fixed to the rear portion of the swing arm 20 is a chain cover 27 covering the upper portion of the drive chain 22.

On top of the main frame 3, there is arranged a fuel tank 4. A seat 30 and a seat cowl 32 are supported by a rear frame 29 fixed to the main frame 3 and extending upwardly rearwards. A headlight 9 is mounted to the front portion of the head pipe 6, and a front fender 13 covering the upper portion of the front wheel WF is fixed to the front forks 11.

Figure 2:
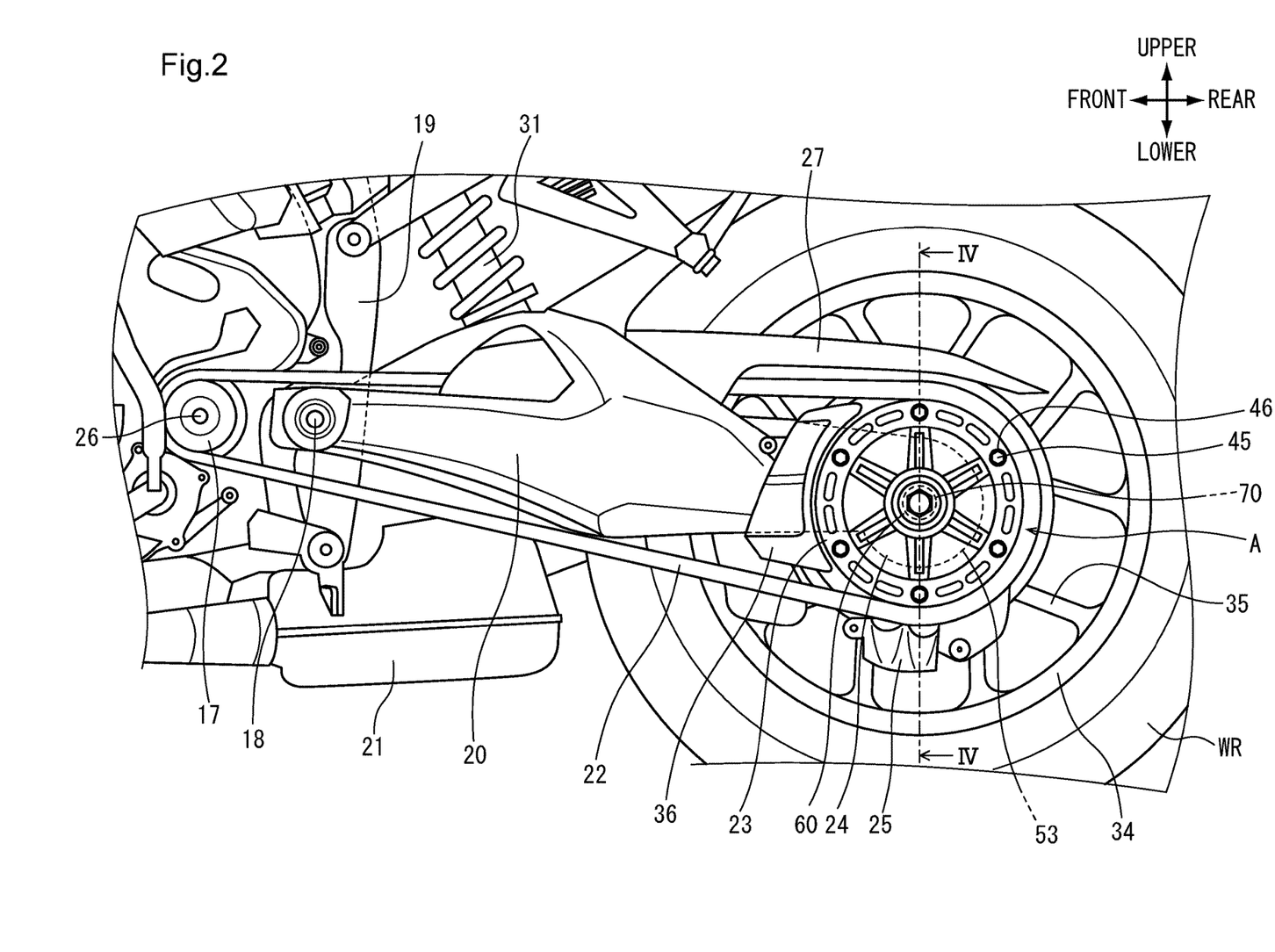
FIG. 2 shows a partial enlarged view of FIG. 1 illustrating the peripheral structure of the swing arm.
Figure 3:
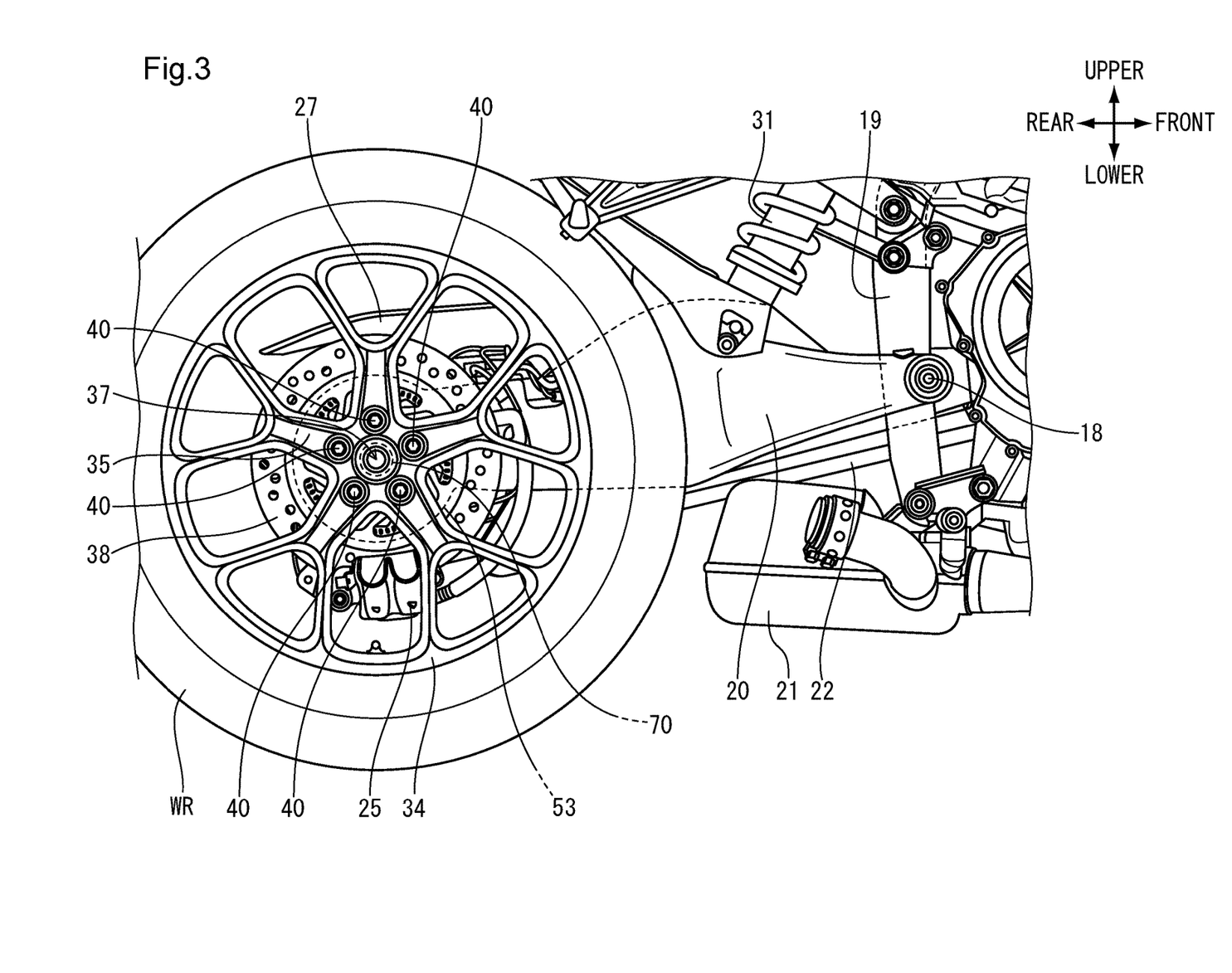
FIG. 3 shows a right-hand side view of the vehicle body illustrating the peripheral structure of the swing arm

FIG. 2 is a partial enlarged view of FIG. 1 illustrating the peripheral structure of the swing arm 20. FIG. 3 is a right-hand side view of the vehicle body illustrating the peripheral structure of the swing arm 20. In the state depicted in FIG. 3, a muffler connected to an expansion chamber 21 and situated on the right-hand side in the vehicle width direction of the rear wheel WR is removed.

The swing arm 20 is of a so-called cantilever-like type which supports the rear wheel WR by a single thick arm member. As compared with the center impeller type, in which the rear wheel WR is supported from both sides by two arms, in the cantilever-like type swing arm 20, one side surface of the rear wheel WR is exposed to thereby improve the outward appearance of the vehicle. At the same time, the attachment and detachment of the rear wheel WR are facilitated.

At the rear end of the swing arm 20, there is provided a substantially cylindrical support portion 53 rotatably supporting the drive shaft 70. A power transmission mechanism A including the driven sprocket 23 and the hub damper case 24 is fixed to one side end portion of the drive shaft 70 protruding from the support portion 53 to the left-hand side in the vehicle width direction. On the other hand, a brake disc 38 and a wheel 34 of the rear wheel WR are fixed to the other side end portion of the drive shaft 70 protruding from the support portion 53 to the right-hand side in the vehicle width direction. A rear brake caliper 25 which holds the brake disc 38 between brake pads to generate a braking force in the rear wheel WR is supported below the support portion 53.

Referring to FIG. 2, the annular driven sprocket 23 is fixed to the outer peripheral side of the hub damper case 24 by using six sets of bolts 45 and nuts 46. On the vehicle body front side of the driven sprocket 23, there is arranged a cover member 36 covering the sprocket teeth. The power transmission mechanism A including the driven sprocket 23 and the hub damper case 24 is fixed to one side end portion of the drive shaft 70 by fastening the bolt 60.

Referring to FIG. 3, the wheel 34 of the rear wheel WR is fixed to a large-diameter flange (see FIG. 4) formed at the other side end portion of the drive shaft 70 by five ball head lock nuts 40. The brake disc 38 is fixed to the inner side surface in the vehicle width direction of this flange by a fastening member (not depicted). At the center of the wheel 34, which has a plurality of spokes 35, there is provided a through-hole 37.

Figure 4:
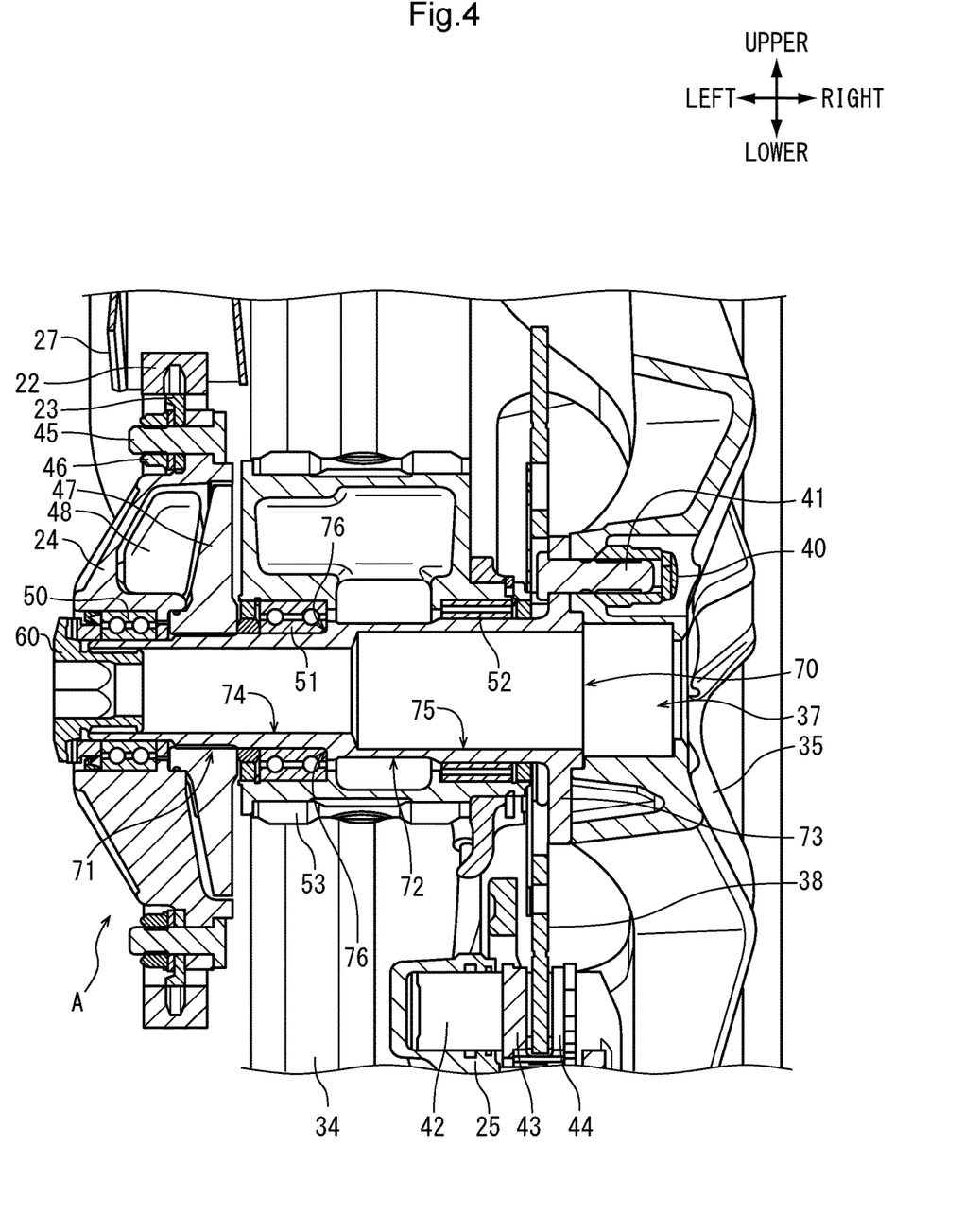
FIG. 4 shows a sectional view taken along line IV-IV of FIG. 2.

FIG. 4 is a sectional view taken along line IV-IV of FIG. 2. The drive shaft 70 is rotatably supported by the support portion 53 provided at the rear end of the swing arm 20. The outer peripheral portion of the drive shaft 70, which is formed as a hollow structure, has a small-diameter portion 71 and a large-diameter portion 72 connected together via a step portion 76. A first ball bearing 51 on the left-hand side in the vehicle width direction of the support portion 53 is fit-engaged with the small-diameter portion 71, and a needle roller bearing 52 on the right-hand side in the vehicle width direction is fit-engaged with the large-diameter portion 72. By being formed as a hollow structure, the drive shaft 70 is reduced in weight, and the inner peripheral portion thereof has an inner small-diameter portion 74 and an inner large-diameter portion 75 in conformity with the small-diameter portion 71 and the large-diameter portion 72.

A plate-like flange portion 73 is formed at the other side end portion (the right-hand side end portion in the vehicle width direction) of the drive shaft 70, and mount bolts 41 passing through the through-hole provided in the flange portion 73 are fit-engaged with the ball head lock nuts 40, whereby the wheel 34 of the rear wheel WR is fixed in position. A hydraulic piston 42 is inserted into the brake caliper 25, which holds the brake disc 38 between brake pads 43 and 44.

When, at the time of the assembly of the portion around the support portion 53, the drive shaft 70 is inserted from the right-hand side in the vehicle width direction of the support portion 53, the step portion 76 abuts the first ball bearing 51, whereby the drive shaft 70 is settled in a predetermined position. In this state, the power transmission mechanism A is mounted to one side end portion of the drive shaft 70 protruding to the left-hand side in the vehicle width direction from the support portion 53.

The power transmission mechanism A includes the driven sprocket 23, the hub damper case 24 supporting the driven sprocket 23 and accommodating a hub damper 48, and a hub damper flange 47 transmitting the power transmitted to the hub damper case 24 to the drive shaft 70. By fastening the bolt 60 to the end portion of the drive shaft 70, the power transmission mechanism A is fixed in a predetermined position so as to be brought to the right-hand side in the vehicle width direction starting from the step portion 76. The bolt 60 is screwed with the female screw portion formed in the inner peripheral surface of one side end portion of the drive shaft 70.

The hub damper case 24 is rotatably supported by the drive shaft 70 by means of a second ball bearing 52. In contrast, the hub damper flange 47 is unrotatably fixed in position through spline fit-engagement with the small-diameter portion 71 of the drive shaft 70. The hub damper case 24 has a plurality of chambers partitioned by plate members, and a plurality of transmission protrusions extending axially outwards from the hub damper flange 47 are inserted into the gaps between the plurality of hub dampers 48 accommodated in the chambers. As a result, the power input to the hub damper case 24 via the driven sprocket 23 is transmitted to the hub damper flange 47 via the transmission protrusions held between the hub dampers 48 formed of rubber or the like, whereby the torque shock due to acceleration and deceleration is mitigated.

Figure 5:
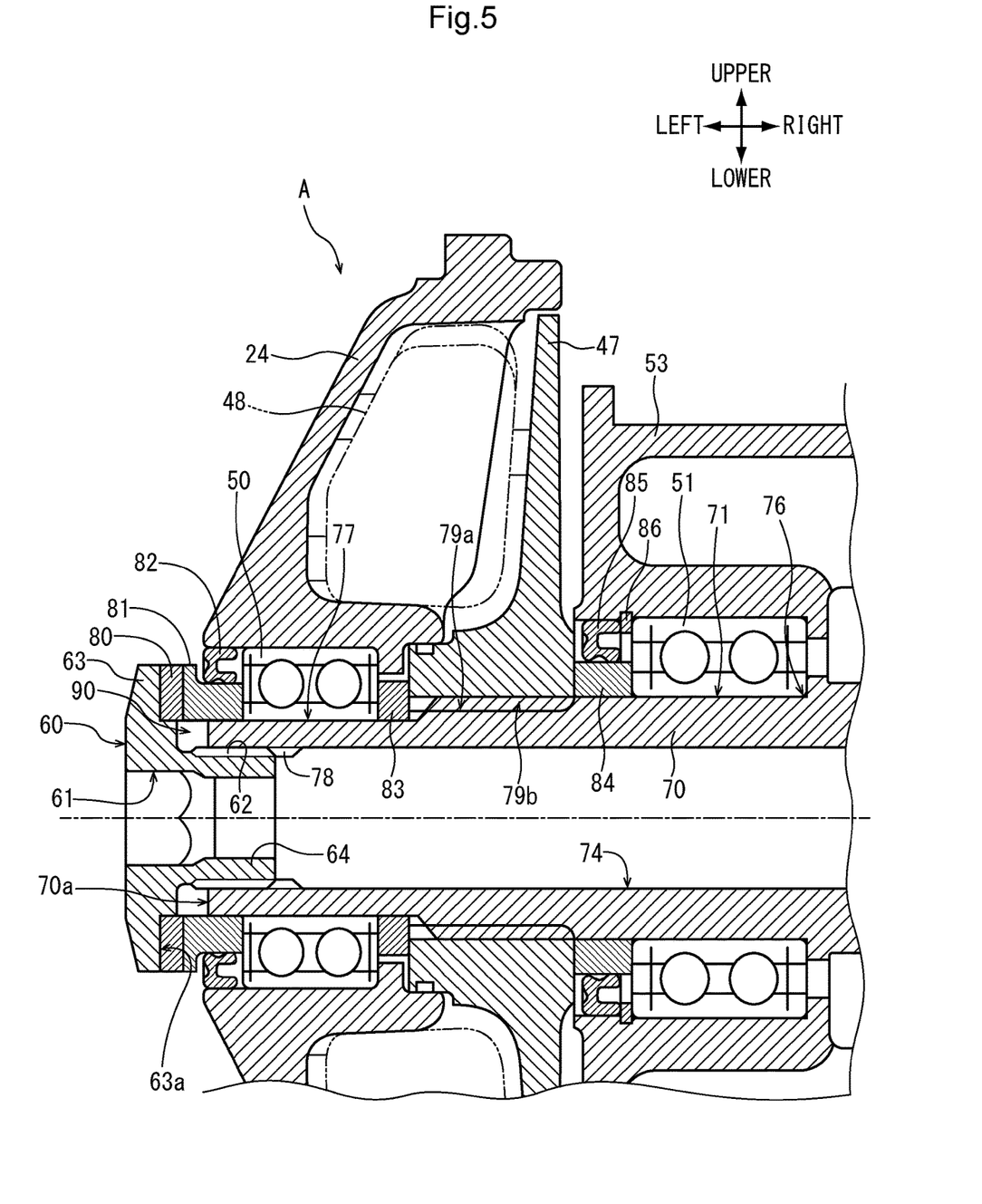
FIG. 5 shows a partial enlarged view of FIG. 4.

FIG. 5 is a partial enlarged view of FIG. 4. The first ball bearing 51 inserted from the left-hand side in the vehicle width direction of the support portion 53 abuts the step portion formed on the support portion 53 and stops before being set in position through engagement of a snap ring 86 with an annular groove. A first annular collar 84 engaged with the small-diameter portion 71 is fitted to the left-hand side in the axial direction of the first ball bearing 51, and a dust seal 85 is arranged on the outer peripheral side of the first annular collar 84.

The hub damper flange 47 abuts the left-hand side end surface in the vehicle width direction of the first annular collar 84. The hub damper flange 47 is unrotatably fixed to the drive shaft 70 through fit-engagement of a spline tooth 7b with a spline groove 79a formed in the small-diameter portion 71.

On the left-hand side in the vehicle width direction of the spline groove 79a of the drive shaft 70, there is formed a second small-diameter portion 77 which is of a still smaller diameter than the small-diameter portion 71. Fit-engaged with the second small-diameter portion 77 are a second annular collar 83 abutting the left-hand side end surface in the vehicle width direction of the hub damper flange 47, and a second ball bearing 50 rotatably supporting the hub damper case 24 while abutting the left-hand side end surface in the vehicle width direction of the second annular collar 83.

Further, a third annular collar 81 abuts the left-hand side in the vehicle width direction of the second ball bearing 50, and a second dust seal 82 is arranged on the outer peripheral side of the third annular collar 81. An annular washer 80 abuts the left-hand side end surface in the vehicle width direction of the third annular collar 81. At the left-hand side end portion in the vehicle width direction of the third annular collar 81, there is formed a flange portion of the same outer peripheral configuration as the washer 80.

In the inner peripheral surface of the left-hand side end portion in the vehicle width direction of the drive shaft 70, there is formed a female screw portion 78 screwed with a male screw portion 62 of the bolt 60. The bolt 60 having a head portion 63 and a shaft portion 64 is formed as a hollow structure provided with a through-hole 61 to attain a reduction in weight. In the present embodiment, the left-hand side portion in the vehicle width direction of the through-hole 61 is formed in a hexagonal configuration so that the bolt 60 can be attached and detached by a hexagonal wrench. As a result, there are no such restrictions as having to form the outer periphery of the head portion 63 in a hexagonal configuration, thus making it possible to enhance the degree of freedom in terms of the design of the head portion 63. In the present embodiment, the outer peripheral end surface of the head portion 63 is formed in a circular configuration of the same diameter as the outer peripheral end surface of the washer 80 and the third annular collar 81, thereby achieving a simple outward appearance and an improvement in terms of fastening strength.

When the bolt 60 is continued to be fastened to the drive shaft 70, the fastening force applied to the bearing surface 63a of the head portion 63 is transmitted in the following order: the washer 80→the third annular collar 81→the second ball bearing 50→the second annular collar 83→the hub damper flange 47→the first annular collar 84→the first ball bearing 51. As described above, the first ball bearing 51 abuts the step portion 76 of the drive shaft 70, so that the above-mentioned components of the washer 80 through the first ball bearing 51 are held between the bearing surface 63a and the step portion 76 and tightened.

In the support structure of a drive shaft according to the present embodiment, the male screw portion 62 of the bolt 60 is screwed with the female screw portion 78 formed in the inner peripheral portion of the drive shaft 70, whereby the power transmission mechanism A is fixed to the drive shaft 70, so that it is possible to elongate the female screw portion 78 to enhance the fastening force for the power transmission mechanism A without having to increase the protrusion amount of one side end portion of the drive shaft 70.

Further, when the bolt 60 is fastened, the distal end of the shaft portion 64 extends to a position where it overlaps the second ball bearing 50 in the axial direction. As a result, the second ball bearing 50 is arranged on the outer peripheral side of the portion where the female screw portion 78 of the drive shaft 70 is screwed with the male screw portion 62 of the bolt 60, so that the rigidity of the screwed portion is enhanced and it is possible to further increase the fastening strength.

In the support structure of a drive shaft according to the present embodiment, when the bolt 60 is fastened, the gap 90 is formed between the head portion 63 and the end surface 70a of the drive shaft 70, so that the head portion 63 of the bolt 60 does not abut the end surface 70a of the drive shaft 70.

Figure 6:
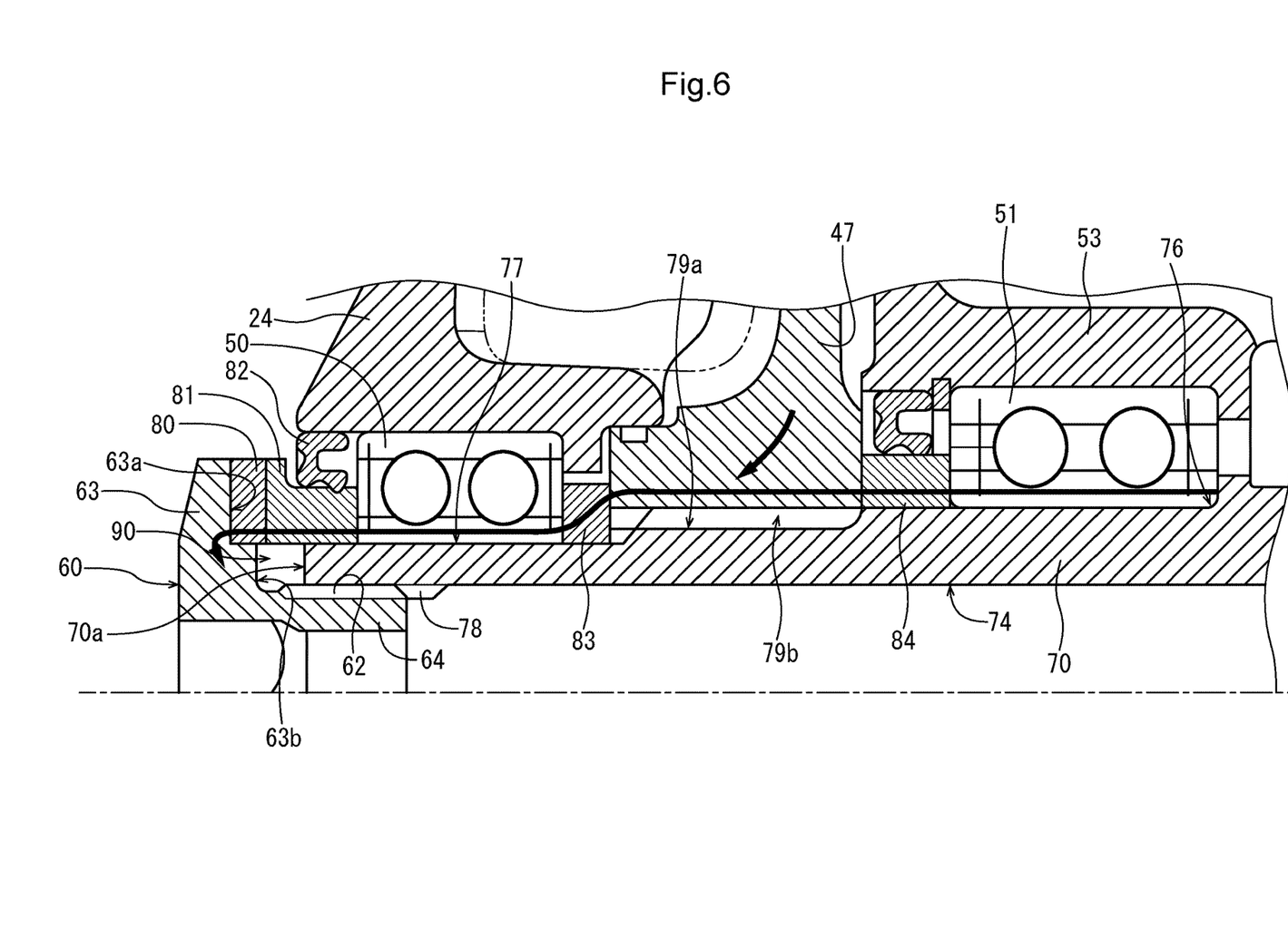
FIG. 6 shows a partial enlarged view of FIG. 5.

FIG. 6 is a partial enlarged view of FIG. 5. The external force input to the drive shaft 70 from the rear wheel WR due to the acceleration/deceleration of the vehicle is input to the head portion 63 of the bolt 60 via the above-mentioned components of the first ball bearing 51 through the washer 80. Further, the external force transmitted from the driven sprocket 23 via the hub damper flange 47 is also input to the head portion 63. In the present embodiment, however, solely the bearing surface 63a formed on the outer peripheral side of the head portion 63 abuts the washer 80, and the gap 90 is provided between the end surface 70a of the drive shaft 70 and the back surface 63b of the head portion 63. As a result, it is possible to avoid an external force input to the head portion 63 of the bolt 60 through torsion of the shaft portion 64, making it possible to prevent the external force from affecting the drive shaft 70. In this way, in the support structure of a drive shaft according to the present embodiment, it is possible to enhance the loosening prevention effect through the provision of the gap 90, so that there is no need to elongate the screw portion to enhance the fastening force for loosening prevention, and to provide loosening prevention means such as a split pin, making it possible to reduce the number of components and the assembly man-hours.

The mode of the motorcycle, the configuration and structure of the swing arm and the support portion, the configuration and structure of the wheel, the component construction of the power transmission mechanism, the configuration and structure of the drive shaft and the bolt, the configuration and arrangement of the bearing and the collar, etc. are not restricted to those of the above embodiment but allow various modifications. The support structure of a drive shaft according to the present invention is applicable not only to a motorcycle but also, for example, to a three-wheeled vehicle equipped with a cantilever-type swing arm.

REFERENCE SIGNS LIST

1 . . . vehicle,
20 . . . swing arm,
24 . . . hub damper case,
50 . . . second ball bearing (bearing),
53 . . . support portion,
62 . . . male screw portion,
63 . . . head portion,
64 . . . shaft portion,
70 . . . drive shaft,
70a . . . end surface of the drive shaft,
71 . . . small-diameter portion,
72 . . . large-diameter portion,
76 . . . step portion,
78 . . . female screw portion,
90 . . . gap,
A . . . power transmission mechanism,
WR . . . driving wheel

What is claimed is:

1. A support structure of a drive shaft in which a power transmission mechanism transmitting a power of a power source and a driving wheel are fixed to a drive shaft rotatably supported by a support portion provided in a vehicle,
wherein a female screw portion is formed in an inner peripheral surface of a hollow portion formed at an end portion of the drive shaft,
wherein the power transmission mechanism is fixed to the drive shaft by fastening a bolt screwed with the female screw portion,
wherein the power transmission mechanism includes a hub damper case arranged at an end portion of the drive shaft,
wherein the hub damper case is rotatably supported by the drive shaft via a bearing,
wherein, when the bolt is screwed with the drive shaft, a male screw portion of the bolt extends to a position where it overlaps the bearing in the axial direction,
wherein an axial through-hole is formed in the bolt, and
wherein a part of the through-hole is formed in a hexagonal configuration.

2. The support structure of a drive shaft according to claim 1, wherein a step portion is provided between a small-diameter portion and a large-diameter portion formed on an outer peripheral surface of the drive shaft, and
a position in an axial direction of the power transmission mechanism fixed to the small-diameter portion side is regulated by the step portion.

3. The support structure of a drive shaft according to claim 1, wherein the vehicle is a motorcycle,
a swing arm of the motorcycle is of a cantilever-type structure in which a single arm supports the drive shaft, the support portion is formed at a rear end portion of the swing arm, and the bolt is screwed with one side end portion of the drive shaft extending through the support portion, and the driving wheel is fixed to the other side end portion of the drive shaft.

4. The support structure of a drive shaft according to claim 2, wherein the vehicle is a motorcycle, a swing arm of the motorcycle is of a cantilever-type structure in which a single arm supports the drive shaft, the support portion is formed at a rear end portion of the swing arm, and the bolt is screwed with one side end portion of the drive shaft extending through the support portion, and the driving wheel is fixed to the other side end portion of the drive shaft.

5. The support structure of a drive shaft according to claim 1, wherein, when the power transmission mechanism is fixed to the drive shaft by fastening the bolt, a gap is formed between an end portion of the drive shaft and a head portion of the bolt.

6. The support structure of a drive shaft according to claim 2, wherein, when the power transmission mechanism is fixed to the drive shaft by fastening the bolt, a gap is formed between an end portion of the drive shaft and a head portion of the bolt.

7. The support structure of a drive shaft according to claim 3, wherein, when the power transmission mechanism is fixed to the drive shaft by fastening the bolt, a gap is formed between an end portion of the drive shaft and a head portion of the bolt.

8. The support structure of a drive shaft according to claim 4, wherein, when the power transmission mechanism is fixed to the drive shaft by fastening the bolt, a gap is formed between an end portion of the drive shaft and a head portion of the bolt.

9. The support structure of a drive shaft according to claim 4, further comprising an empty space between an inner face of a head of the bolt and an end face of the drive shaft.

10. A support structure, comprising:

a drive shaft;

a support portion encircling the drive shaft;

a first bearing between the drive shaft and the support portion;

a hub damper flange connected to and extending radially outwardly from the drive shaft;

a collar and washer on the drive shaft, the collar and washer extending past an end face of the drive shaft; and a bolt connected to the drive shaft, the bolt having a bolt head with an outer face and an inner face, the inner face facing the drive shaft, wherein the inner face of the bolt head contacts the collar and washer and creates an empty space between the inner face and the end face of the drive shaft.

* * * * *